United States Patent
Hackert et al.

(10) Patent No.: US 10,562,177 B2
(45) Date of Patent: Feb. 18, 2020

(54) SYSTEM WITH AT LEAST TWO FLOOR PROCESSING FIXTURES

(71) Applicant: Vorwerk & Co. Interholding GmbH, Wuppertal (DE)

(72) Inventors: Georg Hackert, Bochum (DE); Martin Helmich, Duisburg (DE); Lorenz Hillen, Wuppertal (DE); Christian Holz, Dortmund (DE); Gerhard Isenberg, Cologne (DE); Hendrik Koetz, Wetter (DE); Andrej Mosebach, Bochum (DE); Roman Ortmann, Huerth (DE); Robin Dulinski, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 6 days.

(21) Appl. No.: 16/008,161

(22) Filed: Jun. 14, 2018

(65) Prior Publication Data
US 2018/0361569 A1 Dec. 20, 2018

(30) Foreign Application Priority Data
Jun. 16, 2017 (DE) ........................ 10 2017 113 288

(51) Int. Cl.
| | |
|---|---|
| *B25J 9/16* | (2006.01) |
| *B25J 9/00* | (2006.01) |
| *H04L 12/28* | (2006.01) |
| *G05D 1/02* | (2020.01) |
| *G05D 1/00* | (2006.01) |

(Continued)

(52) U.S. Cl.
CPC ............. *B25J 9/0084* (2013.01); *A01B 79/00* (2013.01); *B25J 9/1666* (2013.01); *B25J 9/1689* (2013.01); *G05D 1/0027* (2013.01); *G05D 1/0212* (2013.01); *H04L 12/2816* (2013.01); *A01D 34/008* (2013.01); *A47L 2201/06* (2013.01); *G05D 2201/0203* (2013.01)

(58) Field of Classification Search
CPC ...... B25J 9/0084; B25J 9/1666; B25J 9/1689; B08B 5/02; B08B 5/04; A01D 34/008; A47L 2201/06; A47L 11/32; A47L 9/1683; G05D 1/0027; G05D 1/0212; G05D 2201/0203
USPC .................................. 700/245, 248; 15/246.3
See application file for complete search history.

(56) References Cited

U.S. PATENT DOCUMENTS

| | | | |
|---|---|---|---|
| 5,959,423 A * | 9/1999 | Nakanishi | A47L 11/305 15/319 |
| 10,180,685 B2 * | 1/2019 | Ratanaphanyarat | G05D 1/0246 |

(Continued)

*Primary Examiner* — Dalena Tran
(74) *Attorney, Agent, or Firm* — Collard & Roe, P.C.

(57) ABSTRACT

A system has at least two floor processing fixtures of one or several automatically moving floor processing devices for the automatically controlled processing of a surface. In order to further develop such a system in particular with the aim of having the floor processing fixtures advantageously interact and support each other, the system has a shared database allocated to the floor processing fixtures, which is stored in an external memory designed separately from the floor processing device, and in which operational activities for the floor processing fixtures are planned according to defined rules, as well as a central computing device allocated to the database, which plans operational activities according to defined rules.

9 Claims, 1 Drawing Sheet

(51) Int. Cl.
*A01B 79/00* (2006.01)
*A01D 34/00* (2006.01)

(56) References Cited

U.S. PATENT DOCUMENTS

| | | | | |
|---|---|---|---|---|
| 2002/0156556 A1* | 10/2002 | Ruffner | ............... | A01D 34/008 701/23 |
| 2006/0060216 A1* | 3/2006 | Woo | ..................... | A47L 9/0009 134/18 |
| 2017/0361468 A1* | 12/2017 | Cheuvront | ............ | A47L 9/2805 |

* cited by examiner

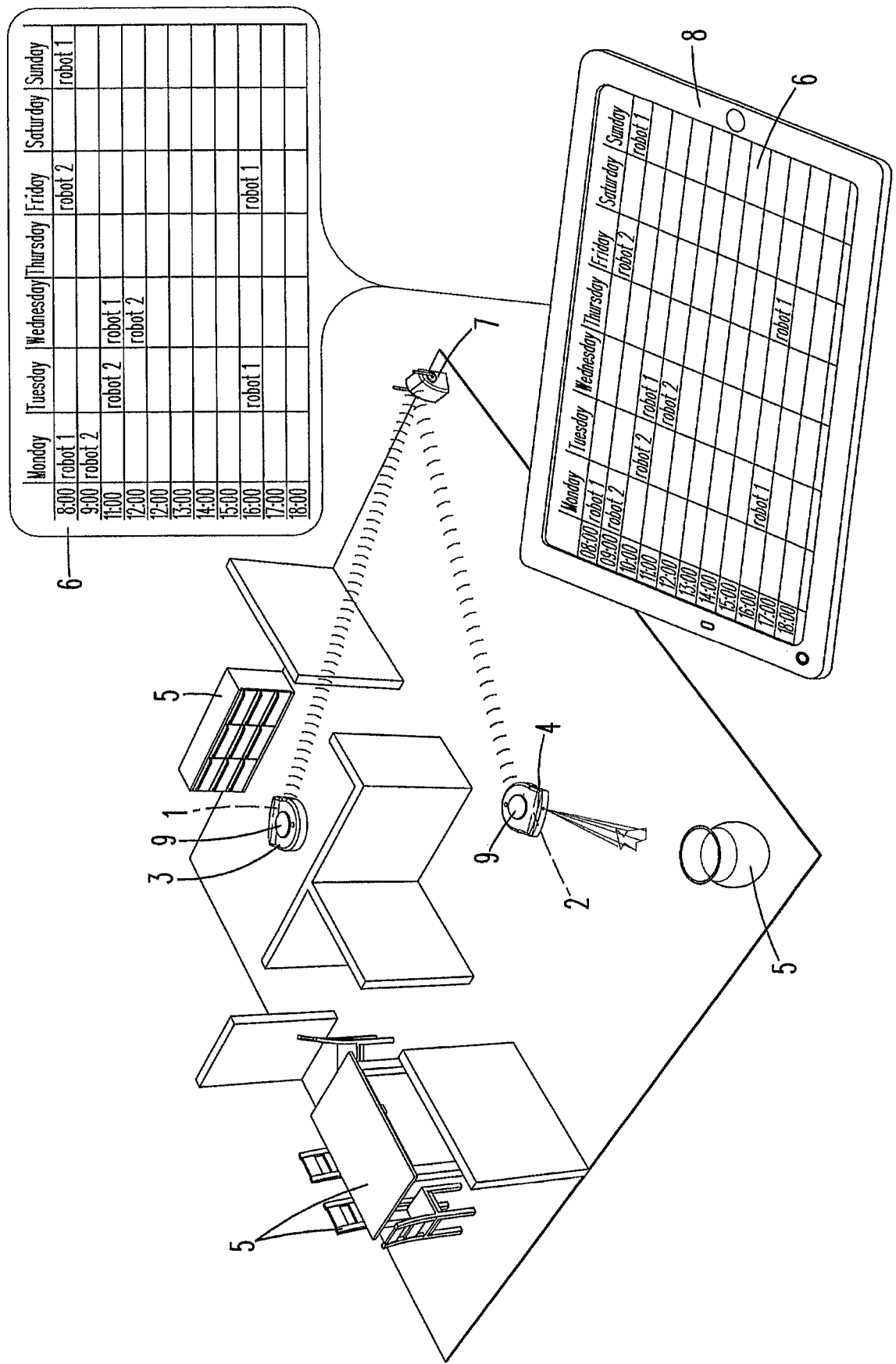

SYSTEM WITH AT LEAST TWO FLOOR PROCESSING FIXTURES

CROSS REFERENCE TO RELATED APPLICATIONS

Applicant claims priority under 35 U.S.C. § 119 of German Application No. 10 2017 113 288.0 filed Jun. 16, 2017, the disclosure of which is incorporated by reference.

BACKGROUND OF THE INVENTION

1. Field of the Invention

The invention relates to a system with at least two floor processing fixtures of one or several automatically moving floor processing devices for the automatically controlled processing of a surface.

The invention further relates to a method for operating a system with at least two floor processing fixtures of one or several automatically moving floor processing devices, wherein a surface is processed in an automatically controlled manner by the floor processing fixtures.

2. Description of the Related Art

Floor processing fixtures as components of automatically moving floor processing devices are known in prior art. For example, the floor processing fixtures can be cleaning elements, such as brushes or wiping elements, polishing elements, grinding elements, mowing tools or the like. The floor processing fixtures can be components permanently installed on the floor processing devices or exchangeable components. In particular, the floor processing devices having the floor processing fixtures are floor processing robots, for example cleaning robots for vacuuming, wiping, polishing, grinding and/or lawns.

Further known in prior art is to automatically control the floor processing fixture of a floor processing device. The floor processing fixture carries out operational activities, for example wherein the floor processing fixture vacuums a surface, cleans a surface with a bristle roller, applies liquid to a surface or the like. It is known to perform various operational activities simultaneously or in chronological sequence.

SUMMARY OF THE INVENTION

Even though autonomous floor processing devices with automatically controlled floor processing fixtures have proven themselves, the object of the invention is to create a system with several floor processing fixtures of several automatically moving floor processing devices each having at least one floor processing fixture, which has been further developed with the aim of having the floor processing fixtures advantageously interact and support each other.

Created in order to achieve the above object is a system with at least two floor processing fixtures of one or several automatically moving floor processing devices for the automatically controlled processing of a surface, wherein the system has a shared database allocated to the floor processing fixtures, in which operational activities for the floor processing fixtures are planned according to defined rules.

According to the invention, the system is now designed to provide a shared database, which contains operational activities for several floor processing fixtures or floor processing devices. The operational activities of the floor processing fixtures are coordinated in such a way as to advantageously interact. For example, the system according to the invention can have a single floor processing device with at least two floor processing fixtures, two floor processing devices each with one floor processing fixture, or also more than two floor processing devices with one or more floor processing fixtures. It is recommended in particular that the floor processing fixtures have different cleaning capabilities, for example that they be designed as a cleaning element for dry cleaning and a cleaning element for wet cleaning. The shared database allocated to the floor processing fixtures serves as a primary database of the system for planning operations of the floor processing fixtures according to established rules. These rules can be established by a system user and relate to existing conditions during which the floor is to be processed by means of one or even several floor processing fixtures.

It is proposed that the floor processing fixtures be formed on the same floor processing device or on two different floor processing devices. Within the meaning of the invention, an embodiment can be provided in which the system has only a single floor processing device. However, in this case, the floor processing device has at least two floor processing fixtures, the operational activities of which are planned according to defined rules in the database. In addition, the system can also have two floor processing devices, wherein each of the floor processing devices then has at least one floor processing fixture. For example, the floor processing fixtures can be a dry cleaning element and a wet cleaning element, wherein it makes no difference in terms of the invention whether the latter are arranged on the same floor processing device or on two different floor processing devices.

For example, a floor processing device can have a detection system, by means of which an environment of the system can be acquired. For example, the detection system can be a camera, which is aimed at a floor surface of a room. The detection system can be used to detect obstacles within the environment, but also objects that require an operational activity of a floor processing fixture. For example, this can be a soiled portion of the floor surface. The images of the camera or even measuring data of a distance measuring system can be used to generate an area map, based on which a movement of the floor processing device can be planned. For example, a detection system designed as a distance measuring system operates without contact using light and/or ultrasound. The area map generated from the environment data can be linked with the shared database allocated to the floor processing fixtures, thus making an identical area map available to all floor processing devices that access the database. In addition to acquiring environment data for navigation purposes, the detection system can also detect events within the environment that require an operational activity of a floor processing fixture. For example, the detection system can detect a soiled portion of a floor surface, for example even the type of soiled area, for example coarse material, stains and the like. This information is advantageously linked with information about the corresponding spatial position and transmitted to a computing device of the system, which updates the shared database, i.e., plans operational activities for the floor processing fixtures according to defined rules. Alternatively, the detection system can also be arranged outside of the floor processing device within the environment, for example in the form of a ceiling camera or a separate exploration robot, which itself does not carry out any cleaning activity, but is able to determine a soiled area, type of soiled area and its spatial position. In order to determine a soiled area, the detection system can initially record an image of the floor surface in an unsoiled state, with this image subsequently being used as a reference, with which images recorded later can be evaluated in relation to potential soiled area. Based on pattern recognition, the soiled area is thus detected and allocated to a specific spatial position.

It is proposed that the operational activities of the floor processing fixtures be planned based on the time and/or event. For example, if the operational activities are planned based on the time, the database can have a table in which the operational activities for each floor processing fixture are planned by year, month, day and/or time of day. Since the database is a shared database allocated to the floor processing fixtures, the table contains both operational activities for a first floor processing fixture and operational activities for a second floor processing fixture, and possibly operational activities for additional floor processing fixtures. This results in a type of time correlation in which the database contains information about what operational activity is performed at a specific time by which floor processing fixture. The operational activities can further be alternatively or additionally planned based on an event, so that if-then links between defined events and resultantly initiated operational activities of the floor processing fixtures are defined. Operational activities can here simultaneously be defined based on time and event. For example, an operational activity of a floor processing fixture can only be initiated if a defined event arises at a specific time.

It is further proposed that two or more operational activities of one or several floor processing fixtures be planned one based on the other. In this embodiment, at least two operational activities are planned in such a way that a second operational activity is only performed if a first operational activity was performed beforehand. It can here be stipulated as a precondition that a first operational activity was even performed at all or that the first operational activity involved a specific content. For example, the first operational activity can be a vacuum cleaning, and the second operational activity a wipe cleaning, but one that would only make sense if preceded by vacuuming. If the first operational activity is not carried out, the second operational activity is also eliminated. Within the shared allocated database, a least two operational activities thus comprise a sequence of activities, in which a subsequent operational activity depends on an earlier operational activity.

It is further proposed that the database be stored in a local memory of a floor processing device and/or in an external memory designed separately from it. In particular, the separately designed external memory can be a memory of a webserver, for example a cloud, or a memory of a mobile communication device, for example a mobile phone, tablet computer, laptop or the like. As a consequence, the shared database of the system can basically be accommodated in any floor processing device or also in a separate device of the system. If the database is stored in a local memory of a floor processing device, the other floor processing devices present in the system still access the shared database. Communication between the floor processing devices and memory preferably takes place wirelessly, in particular using a radio technology, such as WLAN, Bluetooth or ZigBee. In addition, wired communication can basically also be used, for example if the memory is incorporated in a base station to which a floor processing device can be docked. The base station is preferably used not only to store the database, but rather also to carry out one or several service activities for a floor processing device, for example to charge a battery of the floor processing device, empty a suction material collector or the like. For example, the system can additionally have a server located in a household or on the internet, an external calculator or an external control unit or a smartphone designed as one and/or a tablet computer with a corresponding application, and be connected with the floor processing devices having the floor processing fixtures and/or existing base stations, whether wirelessly or, in the case of strictly in-house system components, hardwired.

It is further proposed to have stored a subsequent activity for an operational activity stored in the database, wherein the subsequent activity is defined in particular based on a failure of the performed operational activity. Operational activities are interlinked in the database in such a way that an operational activity has stored for it a subsequent activity that is to be carried out either as a chronological function of it, or only when defined conditions are present, for example in a case where the operational activity fails. For example, the definition of a failed operational activity can be when the operational activity cannot be successfully carried out and/or fully completed by a floor processing fixture. If the first planned operating activity fails, a controller of the system retrieves the subsequent activity defined for this case from the database, so that another floor processing fixture can potentially be actuated for carrying out the operational activity. For example, given a soiled area that was not eliminated by the floor processing fixtures, another floor processing fixture can be used for elimination. The rules according to which subsequent activities are defined can be manually entered into the system by the user, for example via an input interface of one of the floor processing devices, an input interface of a base station containing the database, or also by means of a separate terminal, for example a mobile phone, a PC, a laptop and/or a tablet computer, on which an application is installed for accessing the database. For example, the following could be defined as a subsequent action: Eliminating a soiled area not completely eliminated in a first step (either by the same floor processing fixture or another floor processing fixture), analyzing the malfunction, spot cleaning a spatial position that is intensively soiled, transmitting a message about a failed operational activity to a system user, transmitting a message about a failed operational activity to an external provider, for example to a manufacturer of the floor processing fixture carrying out the failed operational activity.

In particular, it is proposed that the subsequent activity be a repeated operational activity and/or an operational activity of another floor processing fixture and/or that the subsequent activity involve a fault analysis and/or user notification.

Aside from the system described above, the invention further proposes a method for operating a system with at least two floor processing fixtures of one or several automatically moving floor processing devices, wherein a surface is processed by the floor processing fixtures in an automatically controlled manner, wherein operational activities for the floor processing fixtures are planned according to defined rules, wherein the planned operational activities are stored in a shared database allocated to the floor processing fixtures. As already described above with respect to the system, the method according to the invention now makes it possible to link the performance of operational activities by several floor processing fixtures via a shared database, which involves planning the operational activities of several floor processing fixtures. The floor processing fixtures thus do not work independently of each other, but rather access the same database, which coordinates the operational activities so that they do not impede each other, but rather preferably enhance and support each other according to defined rules. The additional advantages and features of the method according to the invention are as described above with respect to the function of the system according to the invention.

In particular, it is proposed that the operational activities of the floor processing fixtures be planned based on time and/or event, and/or that two or more operational activities of one or several floor processing fixtures be planned one based on the other.

In addition, it can be provided that a defined subsequent activity be performed depending on a specific event, in particular the failure of a performed operational activity, in particular involving a repeated operational activity and/or an operational activity of another floor processing fixture and/or a fault analysis and/or a user notification.

As a whole, then, the method can provide that two autonomously operating floor processing devices with different cleaning capabilities, i.e., different floor processing fixtures, work together in defined situations. For example, in the event that a soiled area is detected by one of the floor processing devices that cannot be eliminated by this floor processing device, the situation can be responded to by transmitting a message about the failure of the operational activity to the database, which thereupon outputs a subsequent activity provided for this case. The shared database allocated to the floor processing fixtures or floor processing devices plans operations according to prescribed rules. These rules can be set by a system user and define boundary conditions under which an operational activity is or is not to take place. In an especially simple case, operational planning involves purely time scheduling. In addition, operational planning can also take place based on event. For example, it can be provided that a floor processing device initiate a supplemental cleaning service by a second floor processing device if the operational activity fails. For example, the shared database of the floor processing devices can define that a floor processing device provided for supplemental processing be steered toward a specific deployment site for purposes of spot cleaning. In addition, a soiled area detected by a first floor processing device can be analyzed, so that supplementary processing by another floor processing device only takes place given a high enough probability that cleaning will succeed. It can further be provided that a system user receive a notification about an unsuccessfully performed operational activity, so that the user can manually set, modify and/or confirm a subsequent activity, if needed. As an alternative or in addition to notifying a user, an external provider can also be notified, who then can offer and/or perform a professional cleaning with special cleaning means. In addition to operational planning, the central management of mapping information can also be provided within the system, thus making an identical area map available to all floor processing devices connected in the system, which is advantageous for steering the respective floor processing device to a specific location.

In particular, a multi-stage floor processing operation can yield optimal success, for example if a first floor processing fixture was unable to produce the desired floor processing success. The multistage capability is characterized in that the function of preferably two or more types of floor processing fixtures is synchronized, so that cleaning can be optimized in terms of time/performance.

An exemplary embodiment can provide that a dry cleaning device perform a cleaning operation in a room and use a detection system to detect areas that cannot be cleaned, for example areas with caked on dirt. The dry cleaning device relays this information to a controller of the system, which retrieves a subsequent action for this situation from the shared, allocated database. For example, the subsequent activity defined for the failed operational activity of the dry cleaning device can involve a wet cleaning device traveling to the spatial position in question and there performing a wet cleaning. Should this spatial area not be suitable for a wet cleaning, or wet cleaning fails for some other reasons, another subsequent activity can provide that the controller of the system inform a user about the failed activity, so that the user has the opportunity to perform the cleaning manually. For example, an app installed on a mobile external device can be used to notify the user.

BRIEF DESCRIPTION OF THE DRAWING

The invention will be explained in more detail below based on an exemplary embodiment. Shown on:

FIG. 1 is a system according to the invention with two floor processing devices and a shared database allocated thereto.

DETAILED DESCRIPTION OF THE PREFERRED EMBODIMENTS

FIG. 1 shows an environment, specifically a partial area of a home with several rooms. A plurality of obstacles 5 is arranged in the rooms, for example pieces of furniture and spatial boundaries. Located in the environment is a system here comprised of two automatically moving floor processing devices 3, 4, as well as a memory 7 designed separately thereto, in which a database 6 is stored. For example, the memory 7 is here a household server, which has a communications link with an external communication device 8 in addition to the floor processing devices 3, 4.

Even though not shown on the figure, the memory 7 could also be part of a base station designed to carry out one or several service activities for the floor processing devices 3, 4. For example, floor processing devices 3, 4 could be connected with such a base station, so as to charge a battery or empty a suction material collector.

The floor processing devices 3, 4 each have a local memory (not depicted), in which an area map of the environment is stored. The floor processing device 3, 4 can use the area map to orient itself while automatically moving in the environment and self-localize. For example, the floor processing devices 3, 4 are here a floor processing device 3 designed as a wiping robot and a floor processing device 4 designed as a vacuuming robot. The floor processing devices 3, 4 have motor-driven wheels, which they can use to move within the environment. In addition, the floor processing devices 3, 4 have floor processing fixtures 1, 2. The floor processing device 3 here has a floor processing fixture 1 designed as a wiping roller, and the floor processing device 4 has a floor processing fixture 2 designed as a bristle roller. The floor processing fixtures 1, 2 are used to act on a surface to be cleaned. The floor processing device 4 designed as a vacuuming robot further has a suction nozzle opening (not shown in any greater detail), which can be used to aspirate air loaded with suction material into the floor processing device 4 by means of a motor-fan unit. For example, the floor processing device 3 designed like a wiping device has a liquid tank (not shown in any greater detail) and a liquid application system, which can dispense liquid from the liquid tank onto the floor processing fixture 1, specifically the wiping roller, and/or the surface to be cleaned. The floor processing devices 3, 4 each have a rechargeable battery (not shown) for supplying power to the individual electrical components of the floor processing devices 3, 4, such as for driving the wheels, the floor processing fixtures 1, 2 and other provided electronics.

The floor processing devices 3, 4 are further each equipped with a detection system 9, which here has a triangulation measuring system, for example. The detection system 9 measures distances to the obstacles within the environment. The respective detection system 9 specifically has a laser diode, whose emitted light beam is guided out of a housing of the floor processing device 3, 4 by a diverter, and can rotate around a rotational axis that is perpendicular in the depicted orientation of the floor processing device 3, 4, in particular within an angular range of 360 degrees. This enables a distance measurement around the entire floor processing device 3, 4. The detection system 9 can be used to measure the environment in a preferably horizontal plane, i.e., in a plane parallel to the surface to be cleaned. As a result, the floor processing device 3, 4 can travel in the environment without colliding with obstacles 5. The environment data recorded by the detection system 9 are used to generate an area map of the environment. For example, the floor processing device 3, 4 can further have an odometer (not shown), which measures the distance covered by the respective floor processing device 3, 4. In addition, it is also possible for the floor processing device 3, 4 to have a contact sensor or the like, for example.

The floor processing devices 3, 4 have a communications link to the memory 7 with the shared database 6 stored therein. For example, the communications link is here a WLAN connection.

In the invention according to this embodiment, for example, the floor processing devices 3, 4 carry out cleaning activities within the environment. While moving, the floor processing devices 3, 4 access the local area map stored in the respective floor processing device 3, 4. The cleaning activities of the floor processing devices 3, 4 are controlled depending on a cleaning plan, which is stored in the database 6 of the memory 7.

As shown on the figure, the database 6 has a calendar, which contains cleaning activities for the floor processing devices 3, 4 planned by day of the week and time of the day. As an example, the database 6 initially contains a planned cleaning activity for "Robot 1", here for example the floor processing device 4 designed as a vacuuming robot, which is scheduled for 8 a.m. on calendar day Monday.

The floor processing device 4 first carries out the planned cleaning of the environment by means of the floor processing fixture 2, as stored in the database 6. The floor processing device 4 here preferably moves within the environment according to a planned route, which can be stored in a local memory of the floor processing device 4 or also in the database 6. During the movement or at the latest after the cleaning activity is complete, a sensor array of the floor processing device 4 detects the surface to be cleaned and compares its composition with reference data for clean and dirty states of the floor surface stored in a local memory of the floor processing device 4 or the shared memory 7.

If the floor processing device 4 determines that a soiled area still remains as before despite the cleaning process, here for example caked-on dirt, the floor processing device 4 relays this information to the memory 7. Based on the information, a central computing device allocated to the memory 7 retrieves a subsequent activity from the memory 7, which serves to replace the failed cleaning activity of the floor processing device 4, i.e., eliminating the dirt caked onto the floor. The computing device determines which floor processing devices 3, 4 are available within the system, and the floor processing fixtures 1, 2 available to them. For example, the computing device here determines that the floor must be wet cleaned owing to the caked on dirt. Since the floor processing device 3 has a floor processing fixture 1 suitable for wet cleaning, here specifically a wiping roller, the computing device thereupon plans an event-based operational activity for the floor processing device 3, here specifically a wet cleaning after the failure of the previous dry cleaning activity of the floor processing device 4. As an alternative, the action to be taken if the operational activity of the floor processing device 4 fails can also already be stored in the database in advance, i.e., prior to the operational activity of the first floor processing device 4. In this instance, what subsequent activity is to be performed by which floor processing device 3, 4 can already be planned in advance based on the event, specifically for a case where the operational activity of the first floor processing device 4 fails, so that the cleaning job can be successfully completed.

In both aforementioned cases, i.e., either a spontaneous planning of the subsequent activity given a failed cleaning activity of the first floor processing device 4, or an event-based subsequent activity stored in the database 6 in advance, information about the required subsequent activity is transmitted to the second floor processing device 3, or the floor processing device 3 can derive the subsequent activity from the database 6. A local controller of the floor processing device 3 then controls the floor processing device 3 and accompanying floor processing fixture 1 in such a way that the floor processing device 3 travels to the soiled location, and there performs a wet cleaning. A special embodiment can provide that the subsequent activity planned by the computing device initially be displayed to a system user on a mobile communication device 8 having a communications link with the memory 7, for example here the depicted tablet computer. The user can then confirm the proposed subsequent activity, so that a corresponding control command is transmitted to the floor processing device 3.

In addition or in an alternative embodiment, it is further possible that a system user manually change or supplement the database 6 stored in the memory 7. The user here advantageously accesses the memory 7 or shared database 6 by means of an external communication device 8. In particular, the user can also interdependently set two or more operational activities for a single or several floor processing devices 3, 4 with a total of at least two floor processing fixtures 1, 2, in particular set subsequent activities for planned operational activities, which are to be performed in the event that an implemented operational activity fails.

REFERENCE LIST

1 Floor processing fixture
2 Floor processing fixture
3 Floor processing device
4 Floor processing device
5 Obstacle
6 Database
7 Memory
8 Communication device
9 Detection system

What is claimed is:
1. A system comprising:
   at least two floor processing fixtures of at least one automatically moving floor processing device for the automatically controlled processing of a surface,
   a shared database allocated to the floor processing fixtures, the database being stored in an external memory designed separately from the at least one floor processing device, and in which operational activities for the floor processing fixtures are planned according to defined rules, and a central computing device allocated to the database, the central computing device being configured for planning operational activities according to the defined rules, wherein the database contains if-then links between defined events and resultantly initiated operational activities of the floor processing fixtures, wherein an operational activity of a floor processing fixture can only be initiated if a defined event arises at a specific time and wherein within the shared database at least two operational activities comprise a sequence of activities, in which a subsequent operational activity depends on an earlier operational activity.

2. The system according to claim 1, wherein the floor processing fixtures are formed on the same floor processing device or on two different floor processing devices.

3. The system according to claim 1, wherein the central computing device is configured to plan operational activities of the floor processing fixtures based on time and/or event.

4. The system according to claim 1, wherein the central computing device is configured to plan two or more operational activities of one or several floor processing fixtures, with one of the operational activities being based on the other of the operational activities.

5. The system according to claim 1, wherein a subsequent activity is stored for an operational activity stored in the database, wherein the subsequent activity is defined based on a failure of the performed operational activity.

6. The system according to claim 5, wherein the subsequent activity is selected from the group consisting of a repeated operational activity, an operational activity of another floor processing fixture, a fault analysis and a user notification.

7. A method for operating a system with at least two floor processing fixtures of one or several automatically moving floor processing devices, comprising the following steps:

processing a surface by the floor processing fixtures in an automatically controlled manner, planning operational activities for the floor processing fixtures according to defined rules by a central computing device of the system, and storing the planned operational activities in a shared database that is allocated to the floor processing fixtures, wherein the database is stored in an external memory designed separately from the floor processing device, wherein the database contains if-then links between defined events and resultantly initiated operational activities of the floor processing fixtures, wherein an operational activity of a floor processing fixture can only be initiated if a defined event arises at a specific time and wherein within the shared database at least two operational activities comprise a sequence of activities in which a subsequent operational activity depends on an earlier operational activity.

8. The method according to claim 7, wherein the operational activities of the floor processing fixtures are planned based on time and/or event and/or wherein two or more operational activities of one or several floor processing fixtures are planned one based on the other.

9. The method according to claim 7, wherein a defined subsequent activity is performed depending on a failure of a performed operational activity, and wherein the defined subsequent activity is selected from the group consisting of a repeated operational activity, an operational activity of another floor processing fixture, a fault analysis and a user notification.

* * * * *